(12) United States Patent
Temko et al.

(10) Patent No.: US 11,301,519 B2
(45) Date of Patent: Apr. 12, 2022

(54) METHOD AND SYSTEM FOR EMBEDDING HYPERLINKS IN LEGAL DOCUMENTS

(71) Applicants: Dennis G. Temko, San Diego, CA (US); Adam Shovav, Los Angeles, CA (US)

(72) Inventors: Dennis G. Temko, San Diego, CA (US); Adam Shovav, Los Angeles, CA (US)

(*) Notice: Subject to any disclaimer, the term of this patent is extended or adjusted under 35 U.S.C. 154(b) by 0 days.

(21) Appl. No.: 16/740,309

(22) Filed: Jan. 10, 2020

(65) Prior Publication Data

US 2021/0034681 A1 Feb. 4, 2021

Related U.S. Application Data

(60) Provisional application No. 62/880,041, filed on Jul. 29, 2019.

(51) Int. Cl.
| | |
|---|---|
| *G06F 16/93* | (2019.01) |
| *G06F 40/14* | (2020.01) |
| *G06Q 50/18* | (2012.01) |
| *G06F 40/258* | (2020.01) |
| *G06F 40/205* | (2020.01) |
| *G06F 40/114* | (2020.01) |
| *G06F 40/134* | (2020.01) |
| *G06F 40/103* | (2020.01) |

(52) U.S. Cl.
CPC ............ *G06F 16/94* (2019.01); *G06F 40/103* (2020.01); *G06F 40/114* (2020.01); *G06F 40/134* (2020.01); *G06F 40/14* (2020.01); *G06F 40/205* (2020.01); *G06F 40/258* (2020.01); *G06Q 50/18* (2013.01)

(58) Field of Classification Search
CPC .... G06F 40/103; G06F 40/114; G06F 40/205; G06F 40/258; G06F 16/1794; G06F 40/134; G06F 40/14; G06F 16/94; G06Q 50/18
See application file for complete search history.

(56) References Cited

U.S. PATENT DOCUMENTS

| | | | |
|---|---|---|---|
| 6,289,432 B1 | 9/2001 | Ault et al. | |
| 7,003,719 B1* | 2/2006 | Rosenoff | G06F 16/9558 715/205 |
| 7,890,486 B2 | 2/2011 | Claghorn | |
| 8,661,066 B2 | 2/2014 | Rhoads et al. | |
| 9,372,721 B2* | 6/2016 | Motoyama | G06F 16/355 |
| 9,507,758 B2 | 11/2016 | Bleiweiss et al. | |
| 10,210,579 B1* | 2/2019 | Neveu | G06Q 10/1093 |
| 10,990,631 B2* | 4/2021 | Zholudev | G06F 16/24578 |
| 2007/0016848 A1* | 1/2007 | Rosenoff | G06F 16/94 715/205 |
| 2009/0259642 A1* | 10/2009 | Cao | G06F 16/353 |
| 2009/0292673 A1* | 11/2009 | Carroll | G06F 40/134 |
| 2011/0055162 A1* | 3/2011 | Felderman | G06F 40/123 707/667 |

(Continued)

*Primary Examiner* — Chau T Nguyen
(74) *Attorney, Agent, or Firm* — Lee & Hayes, P.C.

(57) ABSTRACT

A method for embedding hyperlinks in legal documents. The method can include receiving input including docx and PDF documents, converting the input into text, parsing the converted text by pattern recognition, and generating an output of a parent PDF document containing attached documents with hyperlinks, the hyperlinks identifying between the attached documents.

21 Claims, 8 Drawing Sheets

(56) References Cited

U.S. PATENT DOCUMENTS

| | | | |
|---|---|---|---|
| 2014/0304579 A1* | 10/2014 | Foster | G06F 40/134 |
| | | | 715/205 |
| 2015/0261836 A1* | 9/2015 | Madhani | G06F 16/93 |
| | | | 707/602 |
| 2016/0041961 A1* | 2/2016 | Romney | G06F 40/169 |
| | | | 715/230 |
| 2016/0065784 A1* | 3/2016 | Kamimoto | G06F 40/114 |
| | | | 358/1.15 |
| 2016/0239928 A1* | 8/2016 | DuMais | G06Q 50/01 |
| 2019/0087489 A1* | 3/2019 | Culhane | G06Q 50/18 |
| 2020/0020058 A1* | 1/2020 | Stauffer | G06F 16/345 |

* cited by examiner

METHOD AND SYSTEM FOR EMBEDDING HYPERLINKS IN LEGAL DOCUMENTS

CROSS-REFERENCE TO RELATED APPLICATION

This application claims benefit under 35 U.S.C. § 119(e) to U.S. Provisional Patent App. No. 62/880,041, filed Jul. 29, 2019, the entire disclosure of which is hereby incorporated by reference herein in its entirety. Any and all priority claims identified in the Application Data Sheet, or any corrections thereto, are hereby incorporated by reference under 37 CFR 1.57.

TECHNICAL FIELD

The present disclosure relates to systems and methods for embedding hyperlinks in documents. In certain embodiments, the hyperlinks are embedded in legal documents.

BACKGROUND

Appellate lawyers offer up to the court many legal documents, including briefs, appendices, and transcripts. Trial attorneys also offer up to the court many legal documents including, but not limited to, declarations, exhibits, reporter's transcripts, points and authorities, and trial briefs. Currently this process has little standardization, and there are few tools for organizing this work. The appendices and transcripts (the appellate record) that the briefs reference are rarely linked in any way, and so finding the material the brief is referencing is often a time consuming process that involves opening another document in either an electronic or paper format and scrolling or flipping to the correct page. The same is true for trial attorneys as well.

SUMMARY

An embodiment of the present invention provides a method and system for uploading and linking legal briefs to the appellate record, other briefs, and other documents including but not limited to declarations, motions, and exhibits. As applied to trial attorneys, a method and system for uploading and linking trial briefs or points and authorities to exhibits, declarations, and etc. In certain embodiments, the system provides the user with an interface to upload both their brief, the appellate record, other briefs, and other documents including, but not limited to, declarations, motions, exhibits. Once the documents are uploaded as separate files, their formats can be converted if necessary, on the server. Additionally, a user is provided with an interface that allows them to input text which describes the format of their references within the brief that correspond to a given document the user has uploaded. Given this information, the server parses the brief looking for text which matches the format of these references. When it finds a match, it creates a hyperlink around this text so that a user will be able to click on this reference and be immediately directed to the corresponding document in the appellate record or otherwise. When the entire file has been parsed and linked, the individual files are combined by the system into a complete and final file and presented to the user for download.

In some embodiments, a method for embedding hyperlinks in legal documents is disclosed. The method includes receiving input including docx and PDF documents, converting the input into text, parsing the converted text by pattern recognition, and generating an output of a parent PDF document containing attached documents with links, the links identifying between the attached documents.

In some embodiments, a software system capable of acquiring user input, and using that input to parse the legal documents using a pattern matching tool, such as a regular expression in order to identify corresponding sections of text is disclosed.

In some embodiments, a software system capable of converting, consolidating and linking together related electronic legal documents is disclosed.

In some embodiments, a system for embedding hyperlinks in legal documents is disclosed. The system includes a processor and a computer-readable memory in communication with the processor and having stored thereon computer-executable instructions to cause the processor to: receive input including docx and PDF documents; convert the input into text; parse the converted text by pattern recognition; and generate an output of a parent PDF document containing attached documents with hyperlinks, the hyperlinks identifying between the attached documents.

In some embodiments, a non-transitory computer readable storage medium having stored thereon instructions that, when executed, cause at least one computing device to: receive input including docx and PDF documents; convert the input into text; parse the converted text by pattern recognition; and generate an output of a parent PDF document containing attached documents with hyperlinks, the hyperlinks identifying between the attached documents.

BRIEF DESCRIPTION OF THE DRAWINGS

Various embodiments are depicted in the accompanying drawings for illustrative purposes, and should in no way be interpreted as limiting the scope of the embodiments. In addition, various features of different disclosed embodiments can be combined to form additional embodiments, which are part of this disclosure.

DETAILED DESCRIPTION

An embodiment of the present invention provides a method and system for uploading and linking legal briefs with the appellate record (appendices, transcripts, or other cited to material). Trial attorneys also offer up to the court many legal documents including, but not limited to, declarations, exhibits, reporter's transcripts, points and authorities, and trial briefs. Specifically, the system provides the user with an interface to upload both their brief and source documents such as appendices, transcripts, other briefs, points and authorities, and etc.

In certain embodiments, the server does validation on the uploaded files; including but not limited to the verification of MIME types and extensions. In certain embodiments, if the server fails to validate the uploaded data, the client is notified of this failure and given a chance to rectify any errors before attempting the process again.

In certain embodiments, upon successful completion of upload, the documents are both saved to a uniquely identifiable temporary directory on the server. In certain embodiments, this means the data is persisted briefly on the server, which allows for the system to mutate this data more easily and provides the capacity for the information system to retain this data in case of unexpected hardware or software failure.

In certain embodiments, once the documents are both saved, they are converted to the Adobe Portable Document Format (From now on referred to as PDF) if necessary.

In certain embodiments, with this done, the system looks through the text of the brief, and looks for references as described by the user in the interface described above. As the system identifies the references based on their text, the system identifies bounding boxes in the PDF. In certain embodiments, in these boxes, the system places a link. In certain embodiments, the interface does not require users to describe references at all. Instead, the system autonomously recognizes which references are to given source documents on its own and creates hyperlinks.

In certain embodiments with the links established, the system creates a complete combined PDF document which contains both the brief, the appellate record, other (usually previously filed) briefs, and other documents including but not limited to declarations, motions, exhibits, cases, statutes, or any other citeable source document Trial attorneys also offer up to the court many legal documents including, but not limited to, declarations, exhibits, reporter's transcripts, points and authorities, and trial briefs. In certain embodiments, this final document is stored on the server, and the user is given a link to download it. It is in the context of a brief and source documents that the exemplary embodiments are described.

Figure 1:
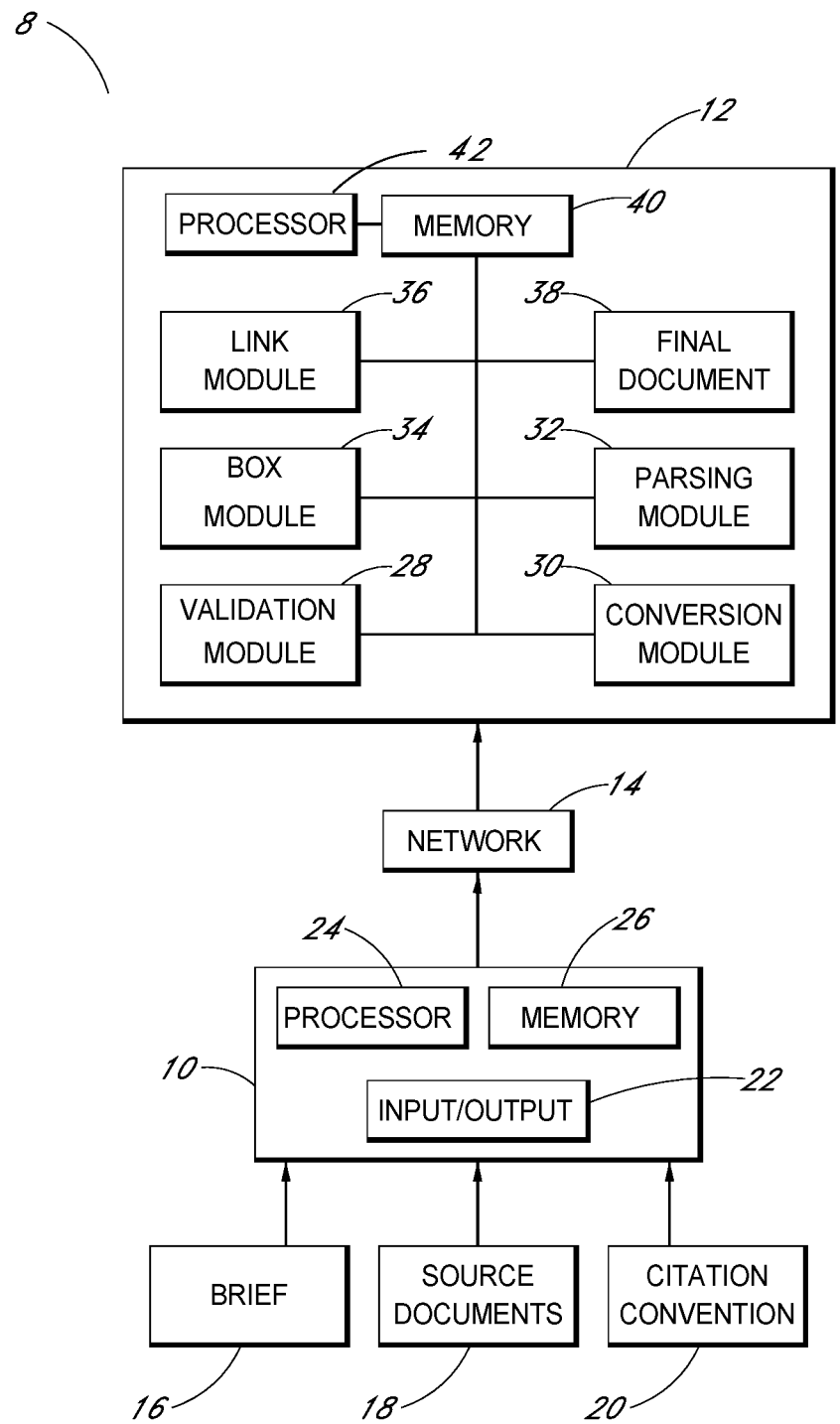
FIG. 1 is a block diagram of an exemplary system embodying several features of a preferred embodiment of the present invention.

FIG. 1 is a block diagram of an exemplary system 8 embodying several features of a preferred embodiment of the present invention. The system 8 incorporates software, methods, and systems for automatically linking and combining brief 16 and source documents 18 by identifying and linking cites in the brief 16 to the source of the cite in the source documents 18. In certain embodiments, the system 8 associates one or more hyperlinks to the citation or cite in the brief 16.

In operation, a plurality of pieces of electronic data corresponding to the text of the brief 16 and the one or more source documents 18 are provided to a computer 10 and temporarily stored in memory 26 and/or memory 40. A processor 24, 42 can automatically process the electronic data, using the processes contained in the software applications contained in the memory 26, 40, to generate information about the brief 16 and the one or more source documents 18 (e.g., hyperlinks), as described below. For example, the processor 24, 42 may parse the text of the brief 16 to identify candidate (i.e., unverified) citations to the one or more source documents 18 and mark these citations for further processing.

The following description is provided in the context of a computer-implemented system and method for automatically identifying identifiers, such as citations and quotations, within a legal document and identifying relationships between the identifier and other legal documents such as source documents. The legal document may be a treatise, case, statute, law review article, transcript, or any other citable source document approved by the filing jurisdiction. It will be appreciated, however, that the disclosed systems and methods have greater utility and may be used for different documents outside of legal documents and the court system.

In certain embodiments, the system 8 comprises an exemplary computer 10 in communication with a server 12 via a network 14. Of course the computer 10 can include a desktop, laptop, personal digital assistant (PDA), phone, or any other input device accessible by the user. In certain embodiments, the computer 10 connects to the network 14 via a wireless connection through a cellular or satellite network using a cellular or satellite modem, but can also connect through any other network carrying another protocol. For example, in certain embodiments, the computer 10 connects to the network 14 via a wired connection. Similarly the network 14 can connect to the server 12 via a wired or wireless connection.

In certain embodiments, the user uploads the brief 16 and the one or more source documents 18 to the computer 10. In certain embodiments, the computer 10 comprises an input/output module 22 configured to receive the brief 16 and the one or more source documents 18. The input/output module 22 provides the user an interface to input text which describes the format of their citations within the brief 18. In certain embodiments, the brief 16 is a legal brief. In certain embodiments, the brief 16 is a motion, petition, writ, trial brief, or other legal document.

In certain embodiments the brief 16 can include one or more exhibits or tabs. In certain embodiments where the brief 16 includes exhibits or tabs, the user identifies that the brief 16 includes exhibits or tabs to the input/output module 22. For example, the user can indicate that the brief 16 includes exhibits or tabs in a source document upload pane. The user may further include in the citation a word indicating the use of the exhibits or tabs. The citation of example 16, below, includes the word "Exh." Of course other text or words can be used. The number following the word "Exh." signifies the number of the exhibit or tab. In certain embodiments the system automatically detects exhibit and tabs without input.

In certain embodiments, the source documents 18 are from an appellate record. In certain embodiments, the appellate record comprises appendices, transcripts, and/or other cited to material. In certain embodiments, the source documents 18 are from declarations, exhibits, reporter's transcripts, points and authorities, and trial briefs. Specifically, the input/output module 22 provides the user with an interface to upload both their brief 16 and the one or more source documents 18 to the computer 10.

In certain embodiments, the user inputs a citation convention 20 to the computer 10. In certain embodiments, the citation convention 20 is indicative of a document within the source documents 18. Any conceivable citation convention 20 is possible, from acronyms to whole words. Preferably, the citation convention 20 is used uniformly throughout the brief 16. An exemplary citation convention 20 is CT for clerk's transcript. In certain embodiments, the system 8 keys on the citation convention 20 to then identify full citations in the brief 16 for further textual analysis. In certain embodiments, users are not required to input a citation convention 20 to the computer 10. Instead, the system autonomously recognizes which references are to given source documents on its own and creates hyperlinks.

In certain embodiments, the citation conventions 20 are predetermined. In certain embodiments, one or more of the citation conventions 20 is determined by the user. For example, in certain embodiments, the user personalizes the citation conventions 20 to more closely match the users desired form of citation. In certain embodiments, such as listed in Example 17, the user merely inputs the letter(s) of their citation convention (e. g., A.A., RT, CT, XYZ, etc.). Multi word text is also acceptable. Exemplary forms of citations include:

Example 1: (1 C.T. p. 103, 125-126, 201-203, 299.)
Example 2: (1 C.T. 103, 125-126, 201-203, 299.)
Example 3: (5 CT pp. 1503, 1525-1526, 1601-1603, 1699.)
Example 4: (6 Clerks pp. 1603, 1625-1626, 1701-1703, 1799.)
Example 5: [2 C.T. 303, 325-326, 401-403, 499.]
Example 6: [3 CT pp. 903, 925-926, 1001-1003, 1099.]
Example 7: [4 Clerks pp. 1203, 1225-1226, 1201-1203, 1299.]
Example 8: (1 R.T 103, 125-126, 201-203, 299.)
Example 9: (3 RT pp. 903, 925-926, 1001-1003, 1099.)
Example 10: (1 Reporters pp. 103, 125-126, 201-203, 299.)
Example 11: [4 XYZ, 1203, 1225-1226, 1201-1203, 1499.]
Example 12: [1 XYZ. pp. 103, 125-126, 201-203, 299.]
Example 13: (1 C.T. p. 103:25-104:5, 125:15-126:34, 201 203, 2991:15-25.)
Example 14: (1 C.T. pp. 103, 125-126, 558 560, 1001; 2 C.T. pp. 301; 5 R.T. p. 10; AOB p. 10.)
Example 15: (1 C.T. pp. 103:25-104:5; 2 C.T. pp. 125: 15-126:34; 5 R.T. p. 10:15; AOB p. 10:5.)
Example 16: (1 Exh. 5, p. 103-104, 125-126, 201 203, 291; 2 Exh. 10, p. 351.)
Example 17: [XYZ]

In certain embodiments, the citation conventions 20 comprise one or more guidelines. In certain embodiments, the one or more guidelines specify a form of the citation. For example, the one or more guidelines can specify how the user bounds the citation within the brief 16. For example, the one or more guidelines can specify that the citation be bound by parenthesis ( ), brackets[ ], or nothing. Referring to Example 1 above, the citation is bound by ( ).

The one or more guidelines can specify how the user identifies a volume associated with the citation within the brief 16. For example, the one or more guidelines can specify that the volume number proceed the document citation. Continuing with Example 1 above, a number of the volume associated with the citation precedes the document citation and has the value.

The one or more guidelines can specify how the user identifies page(s) associated with the citation within the brief 16. For example, the one or more guidelines can specify that the letter "p." must be placed between the document citation and the actual page numbers. Continuing with Example 1 above, the letter "p." is used after the citation convention 20 and before the number 103 in the citation. In other embodiments, the letters "pp." instead of "p." are used after the citation convention 20 and before the number 103 in the citation. In other embodiments, a space is employed instead of "p." or "pp." within the citation to indicate the actual page numbers follow the space.

In certain embodiments the numbers on the pages of the one or more source document 18 include Bates stamp numbers. In certain embodiments, the numbers on the pages of the one or more source document 18 match the Bates stamp numbers. In certain embodiments, the numbers on the pages of the one or more source document 18 do not match the Bates stamp numbers. For example, this may occur if the court reporter left the title page and/or other pages unnumbered. In such a situation, the court reporter may have started the Bates stamp numbers after a few pages. This can also occur if the court reporter decides to un-number pages such as the table of contents and title page.

In such embodiments, the user can sync the numbers on the pages of the one or more source document 18 to the Bates stamp numbers. For example, the pages in the source document that do not include Bates stamp numbers can be re-identified with roman numerals. In this way, the pages identified with roman numerals will not be included in the overall page numbers and the page numbers will then synch to the Bates stamp numbers. In other embodiments, the user can repaginate one or more pages of the source document 18 to synch the numbers on the pages of the one or more source document 18 to the Bates stamp numbers.

In certain embodiments, the system autonomously repaginates the source documents or documents to be hyperlinked page numbers be they Bates stamp numbers or electronic page numbers. In certain embodiments, if a user deletes pages from a source document, the system will re-number page numbers within references contained in the document to be linked so that they match the revised source document.

The one or more guidelines can specify how the user identifies page numbers within the citation within the brief 16. For example, the one or more guidelines can specify that the page numbers within the citation are separated by a character. In certain embodiments, the character is a comma (,). Continuing with Example 1 above, the character is a comma that is placed between 103 and 125 in the citation. Of course, a comma need not be employed. In other embodiments, the character is a colon or semicolon.

The one or more guidelines can specify how the user identifies a range of pages within the citation within the brief 16. For example, the one or more guidelines can specify that the range of pages is separated by a dash (-) character within the citation. Continuing with Example 1 above, the character is a dash (-) that is placed between 125 and 126 in the citation. Of course, a dash (-) need not be employed. In other embodiments, the character is not a dash (-).

The one or more guidelines can specify how the user identifies line numbers within the citation within the brief 16. For example, the one or more guidelines can specify that the line numbers are associated with a preceding page number. In certain embodiments, the line number and the page number are separated by a colon (:) character within the citation. Referring to Example 13 above, the character is a colon (:) that is placed between 103 and 25 in the citation. Of course, a colon (:) need not be employed. In other embodiments, the character is not a colon (:).

The one or more guidelines can specify how the user identifies a series of line numbers within a single citation within the brief 16. For example, the one or more guidelines can specify a comma (,) signifies the end of one page and line number combination and the beginning of a new combination. In certain embodiments, the user places the comma between subsequent page and line number combinations. Continuing with Example 13 above, the character is a comma (,) that is placed between the 5 in the first page and line number combination and the 125 of the second page and line number combination. Of course, a colon (:) need not be employed. In other embodiments, the character is not a colon (:).

The one or more guidelines can specify how the user identifies a plurality of different source documents within a single citation within the brief 16. For example, the one or more guidelines can specify a semicolon (;) separate the different source documents within the single citation. In certain embodiments, the user places the semicolon between different source documents. Referring to Example 14 above, the character is a semicolon (;) that is placed between the 2 C.T. cite and the subsequent 5 R.T. cite. Of course, a semicolon (;) need not be employed. In other embodiments, the character is not a semicolon (;).

The one or more guidelines can specify how the user identifies a plurality of different volumes within a single citation within the brief 16. For example, the one or more guidelines can specify a semicolon (;) separate the different volumes within the single citation. In certain embodiments, the user places the semicolon between different volume. Referring to Example 15 above, the character is a semicolon (;) that is placed between the 1 C.T. cite and the subsequent 2 C.T. cite. Of course, a semicolon (;) need not be employed. In other embodiments, the character is not a semicolon (;).

The computer 10 may further include the processor 24 and the memory 26. The processor 24 may perform one or more modules or processes as explained below. The modules or processes may be software applications that are stored in the memory 26, 40.

The server 12 receives data from the computer 24 via the network 14. In certain embodiments, the date includes one or more of the brief 16, the one or more source documents 18, and the citation convention 20. In certain embodiments, one or more of the brief 16, the one or more source documents 18, and the citation convention 20 are combined into fewer documents before the computer 10 provides the data to the server 12.

The server 12 comprises one or more of a validation module 28, a conversion module 30, a parsing module 32, a box module 34, and a link module 36. The server 12 further comprises the memory 40 and the processor 42. The processor 42 controls the operation of the server 12 and executes the software modules or processes including the validation module 28, the conversion module 30, the parsing module 32, the box module 34, and the link module 36. One or more of the validation module 28, the conversion module 30, the parsing module 32, the box module 34, and the link module 36 can be stored in the memory 40.

In operation, the user inputs electronic data into the computer 10 corresponding to text of the brief 16 and the one or more source documents 18. In certain embodiments, the data is temporarily stored in the memory 26. In certain embodiments, the data is stored in the memory 26 while the server 12 performs one or more of the software modules on the data.

In certain embodiments, once the brief 16 and the one or more source documents 18 are provided to the server 12, the processor 42 performs one or more of the software modules or processes. In certain embodiments, each document (e.g., the brief 16 and the one or more source documents 18) is automatically processed by the processor 42, using the processes contained in the software applications contained in the memory 40. In this way, the processor 42 generates information about the brief 16 and the one or more source documents 18, as described below.

For example, once the brief 16 and the one or more source documents 18 are uploaded, the processor 42 performs the validation module 28. In certain embodiments, the processor 42 does validation on the brief 16 and/or the one or more source documents 18. In certain embodiments, the validation includes a verification of MIME types and extensions for the brief 16 and the one or more source documents 18. In certain embodiments, if the processor 42 fails to validate the brief 16 and the one or more source documents 18, the user is notified via the input/output module 22 of the computer 10 of this failure and given a chance to rectify any errors before attempting the process again.

In certain embodiments, upon successful completion of the upload of the brief 16 and the one or more source documents 18, one or more of the documents are saved to the memory 40 on the server 12. In certain embodiments, at least a portion of the uploaded brief 16 and the one or more source documents 18 are stored in the memory 40. In certain embodiments, at least a portion of the uploaded brief 16 and the one or more source documents 18 are stored in the memory 26 of the computer 10.

In certain embodiments, in this way the brief 16 and the one or more source documents 18 persist briefly on the server 12. By storing the uploaded brief 16 and the one or more source documents 18 in the memory 26 allows for the system 8 to mutate the brief 16 and the one or more source documents 18 more easily and provides the capacity for the system 8 to retain the brief 16 and the one or more source documents 18 in case of unexpected hardware or software failure.

In certain embodiments, after the brief 16 and the one or more source documents 18 are saved in the memory 40, the brief 16 and the one or more source documents 18 are converted by the conversion module 30. In certain embodiments, the conversion module 30 converts the brief 16 and the one or more source documents 18 into Adobe Portable Document Format (PDF).

In certain embodiments, the parsing module 32 parses text of the brief 16 and/or the one or more source documents 18. The server 12 parses the brief 16 looking for text which matches the citation convention 20 input by the user. For example in certain embodiments, the server 12 looks through the text of the brief 16 for text identifying one or more source documents 18 as the one or more source documents 18 were described by the user according to the user defined citation convention 20. The parsing module 32 identifies citations in the brief 16 based on whether the text of the citation corresponds to the text specified in the citation convention 20. In certain embodiments, the box module 34 places a bounding box around each citation identified by the parsing module 32 in the brief 16. Each of these processes may be performed by a software application in the memory 40, which is executed by the processor 42. In certain embodiments, instead of parsing documents for citation convention 20 input by the user, the system instead employs a parent document(s) or source document(s) tables of contents, table of authorities, and likewise comparable data as the basis for identifying text or page numbers to create hyperlinking and also insert bookmarks.

In certain embodiments, the system identifies by highlighting or other visual aid, the text in the source document that corresponds to the argument, facts, or etc, made in the parent document. For example, if the brief/parent document states the sky is blue at CT page 56, the system will identify where the sky is blue on page 56 of the clerk's transcript and visually identify the relevant text. In the circumstance the writer's citation includes line numbers, the system highlights in the source documents the line numbers the writer employed in a given citation in the parent document.

The link module 36 then places a hyperlink in the bounding box. Hyperlinks are selectable to link respective marked portions of the brief 16 to the one or more source documents 18. The hyperlink provides an electronic link to a location(s) within the one or more source documents 18 that corresponds to the citation within the bounding box in the brief 18. In this way, when the server 12 finds text that matches one or more of the citation conventions 20, the box module 34 creates the bounding box in which the link module 36 places the hyperlink. In certain embodiments, a user viewing the final document 38 can select the hyperlink and be immediately directed to the location in the corresponding source document 18 of the one or more source documents 18.

In certain embodiments, the link module 36 uses object oriented programming in order to organize and execute linking and attachment. An "attachment" is known to a person having skill in the art. For example, in an embodiment, the link module 36 uses the appendix paths in a temporary folder. The temporary folder is created to generate a "PDF Linker" object. The PDF Linker has a generate_final_document method, and finally invokes another method to add attachments. The PDF Linker loops through the attachment paths, opening them sequentially and adding the attachments to the main PDF or final document 38. In certain embodiments, the PDF Linker employs the PYPDF2 library to loop through, open, and add the attachments to the main PDF or final document 38. In certain embodiments, after system processing, users are able to remove the attachments from the parent document(s) which contain hyperlinks. Links are still visible, but no longer active. They are broken links. Due to the manner in which documents were processed at the time of link creation, if the user reinserts attachments which were removed, the inactive hyperlinks will reactivate and no longer remain broken. In certain embodiments, where there exists more than one document containing hyperlinks (i.e. document to be linked), and when both cite a common attachment, only one copy of the attachment is required. In certain embodiments, instead of attaching documents to the parent PDF, the system creates hyperlinks that direct users to the online hosted source documents.

In certain embodiments, the actual hyperlinks are generated by a PDFHandler object which is known to a person having skill in the art. In certain embodiments, the PDFHandler object is employed by the python programming language to interface with Adobe.

In certain embodiments when the PDFHandler object is initialized, the PDFHandler object generates the regular expressions for many things. In certain embodiments, the PDFHandler object starts with a base regex as explained below, and then moves on to a regular expression to identify a page number format, a page number prefix, and a page number suffix. The base regex and regular expression are further described below.

In certain embodiments, the system 8 then collects the raw text of the brief 16. In certain embodiments an intermediary step is employed where the system converts the brief 16 to another format, such as HTML.

In certain embodiments, the system 8 analyzes the raw text, identifying link targets based on the text and the regular expression. In certain embodiments when a match is identified, the system 8 builds a rectangle with_get_rect_from_word and_get_link_rect. Once built, the system 8 combines the rectangles as necessary, in case a link spans multiple lines.

Once the system 8 iterates through the pages, the system 8 then identifies the rectangles and builds coordinates from those rectangles. In certain embodiments, the system 8 employs a library called PYPDF2 to add the URLs.

In certain embodiments with the links established, the server 12 creates the final document 38. For example, when the entire brief 16 has been parsed and linked to the one or more source documents 18, it is formed into a complete and final document 38 and presented to the user for download. In certain embodiments, the final document 38 is a complete PDF document which contains both the brief 16 and the one or more source document 18. In certain embodiments, the final document 38 is stored in the memory 40 of the server 12. In certain embodiments, the user is given a link via the input/output module 22 to download the final document 28.

In certain embodiments, the system reads the source documents to determine whether the user's argument, factual statements, case summary/interpretation, statutory summary/interpretation, and etc. contained within the hyperlinked document accurately represent cited material. In such embodiment, the system either imprints in the hyperlinked document a visual accuracy determination for all assertions, facts, argument, and etc., or creates a visual accuracy determination overlay that the user can turn on or off at will, which also displays visual accuracy determinations for brief content. For example, if the writer, citing to a source document, states the sky was blue when a robbery occurred, the system via a direct imprint or overlay, will display the accuracy (either in color, symbol, or etc.) of such a statement based upon the page cited by the writer and/or the entire record. In other words, the color red could indicate a low accuracy percentage while green corresponds to a higher accuracy.

In certain embodiments, the system allows users to input a claim and the trained artificial intelligence model will find all the places in a single or multiple source document(s) that support that claim. For example, the user can ask the system if the element, taking of the property of another exists to support a robbery, and the system will return all text from a single or multiples source document(s) that supports or undercuts that element. The system will also create a summary of the evidence on that point as well. In certain embodiments, the system summarized bodies of text, or entire documents. For example, users may quarry the system to summarize all witness X's cross examination, direct examination, re-cross, or etc. In a clerk's transcript, the user could ask the system to summarize portions of a trial brief, an entire trial brief, or the trial brief in conjunction with its exhibits or other documents.

Figure 2:
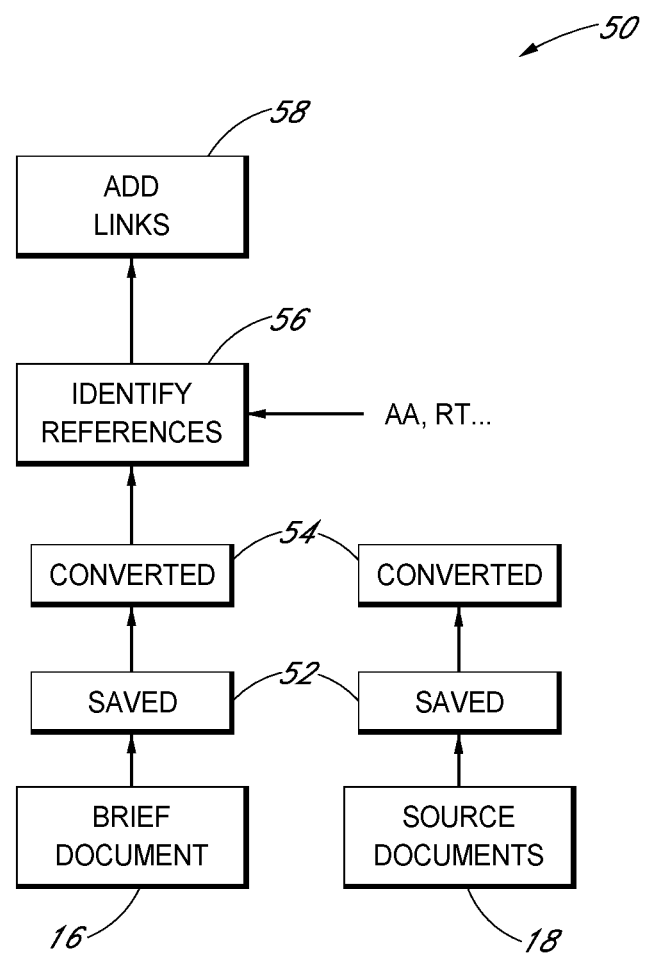
FIG. 2 is a flow chart illustrating an exemplary method performed by the system of FIG. 1.

FIG. 2 is a flow chart illustrating an exemplary method 50 performed by the system 8 of FIG. 1. The method 50 can include more or less steps that the steps in FIG. 2. For example, additional steps can include a validation step as described with respect to FIG. 1.

The method 50 of FIG. 2 begins with the user uploading the brief 16 and the one or more source documents 18 to the computer 10. The method 50 continues at block 52 where the uploaded brief 16 and the one or more source documents 18 are saved to the memory 40 on the server 12.

The method 50 then continues to block 54 where the brief 16 and the one or more source documents 18 are converted to a format for ease of subsequent processing. In certain embodiments, the format is a common format for the brief 16 and the one or more source documents 18. In certain embodiments, the brief 16 and the one or more source documents 18 are converted into Adobe Portable Document Format (PDF) if required.

The method 50 then continues to block 56 where the text of the brief 16 and/or the one or more source documents 18 are parsed and matched to the citation convention 20 input by the user. For example, in certain embodiments, the citation convention 20 input by the user includes AA and RT. In such an example, the system 8 parses and matches the citation conventions 20 AA and RT to the corresponding source document of the one or more source documents 18. The method 50 then continues to block 58 where the hyperlinks are placed in the brief document 16. The hyperlink provides an electronic link to a location(s) within the one or more source documents 18 that corresponds to the citation within the bounding box in the brief 16.

Figure 3:
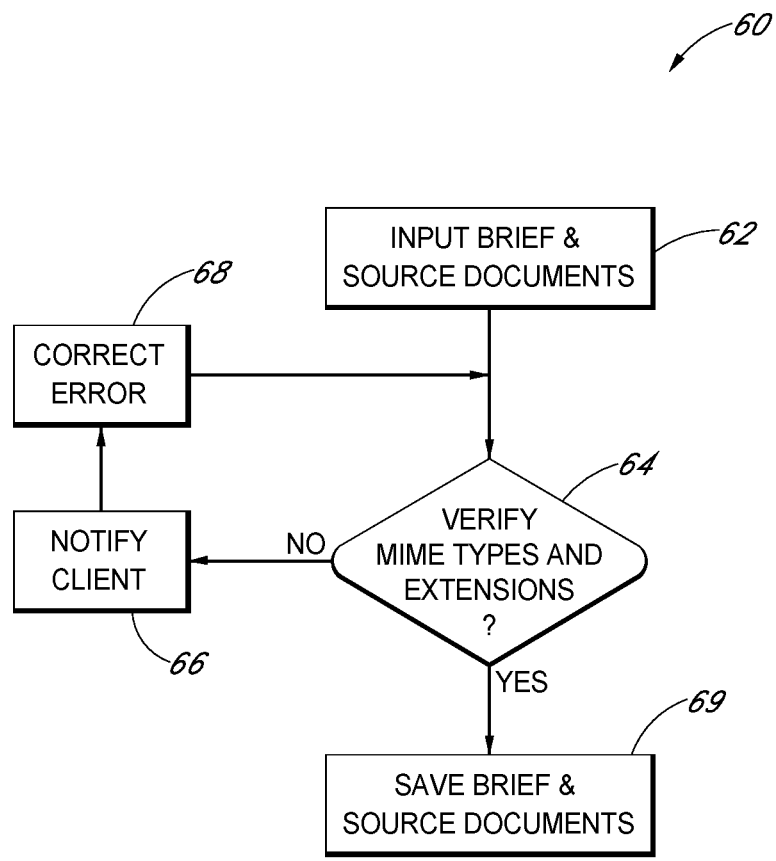
FIG. 3 is a flow chart illustrating an exemplary method for inputting a brief and source documents within the exemplary system.

FIG. 3 is a flow chart illustrating an exemplary method 60 for inputting the brief 16 and the one or more source documents 18 within the exemplary system 8. The method begins at block 62 where the user inputs the brief 16 and the one or more source documents 18 to the computer 10. In certain embodiments, the computer 10 comprises an input/output module 22 configured to receive the brief 16 and the one or more source documents 18. In certain embodiments, the brief 16 is a legal brief. In certain embodiments, the brief 16 is a motion, petition, writ, or other legal document.

In certain embodiments the brief 16 can include one or more exhibits or tabs. In certain embodiments where the brief 16 includes exhibits or tabs, the user identifies that the brief 16 includes exhibits or tabs. For example, the user can indicate that the brief 16 includes exhibits or tabs in a source document upload pane. The user may further include in the citation a word indicating the use of the exhibits or tabs. In certain embodiments, the one or more source documents 18 are from an appellate record. In certain embodiments, the appellate record comprises appendices, transcripts, and/or other cited to material.

The method 60 moves to decision block 64 for validation. In certain embodiments, the validation includes a verification of MIME types and extensions for the brief 16 and the one or more source documents 18. If the MIME types and extensions are not verified, the method 60 moves to block 66 where the method 60 notifies the user. For example, the method notifies the user via the input/output module 22 of the computer 10 of this failure. The method 60 then moves to block 68 where the user is given a chance to rectify any errors before attempting the process again. Once the errors are rectified by the user, the method 60 returns to decision block 64.

Returning to decision block 64, if the MIME types and extensions are verified, the method 60 moves to block 69 where the method 60 saves the brief 16 and the one or more source documents 18 for further processing by the system 8. In certain embodiments, upon successful completion of the upload of the brief 16 and the one or more source documents 18, one or more of the documents are saved to the memory 40 on the server 12. In certain embodiments, at least a portion of the uploaded brief 16 and the one or more source documents 18 are stored in the memory 40. In certain embodiments, at least a portion of the uploaded brief 16 and the one or more source documents 18 are stored in the memory 26 of the computer 10.

In certain embodiments, in this way the brief 16 and the one or more source documents 18 persist briefly on the server 12. By storing the uploaded brief 16 and the one or more source documents 18 in the memory 26 allows for the system 8 to mutate the brief 16 and the one or more source documents 18 more easily and provides the capacity for the system 8 to retain the brief 16 and the one or more source documents 18.

Figure 4:
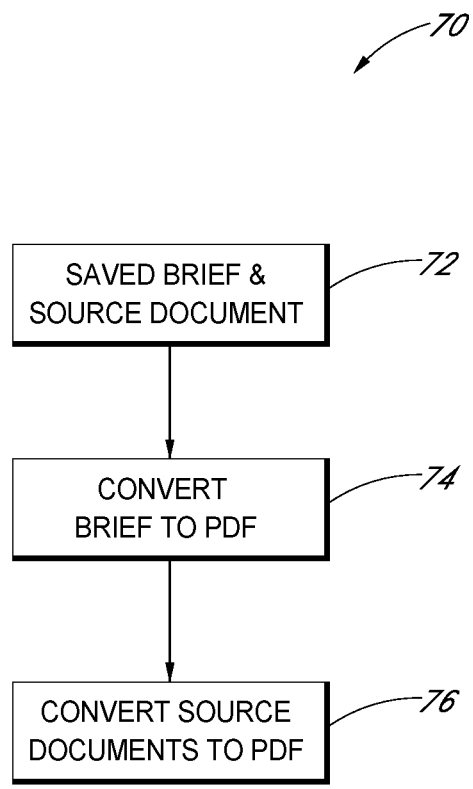
FIG. 4 is a flow chart illustrating an exemplary method for converting the inputted brief and source documents within the exemplary system.

FIG. 4 is a flow chart illustrating an exemplary method 70 for converting the inputted brief 16 and one or more source documents 18 within the exemplary system 8. The method 70 begins at block 72 with the saved brief 16 and one or more source documents 18. The method 70 moves to block 74 where the brief 16 is converted. In certain embodiments, the brief 16 is converted into Adobe Portable Document Format (PDF). The method 70 moves to block 76 where the one or more source documents 18 are converted. In certain embodiments, the one or more source documents 18 are converted into Adobe Portable Document Format (PDF). In certain embodiments, the brief 16 and the one or more source documents 18 are converted to a common format.

Figure 5:
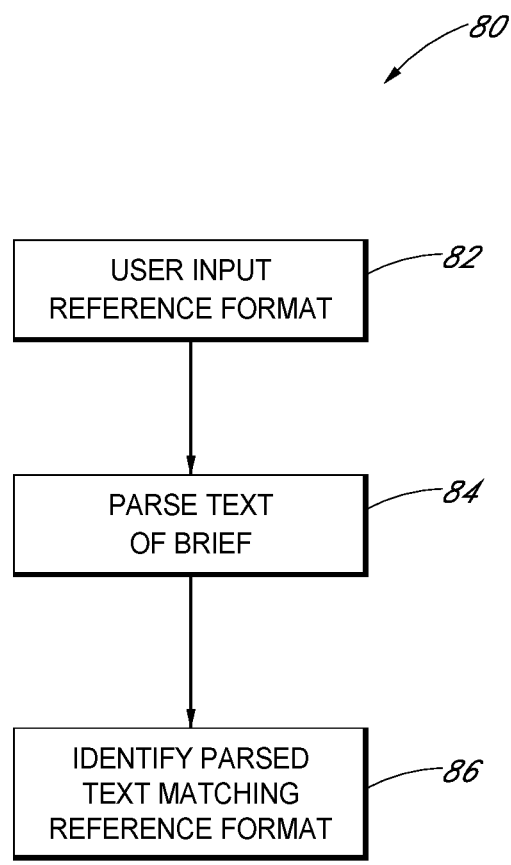
FIG. 5 is a flow chart illustrating an exemplary method for parsing text of the converted brief and source documents within the exemplary system.

FIG. 5 is a flow chart illustrating an exemplary method 80 for parsing text of the converted brief and source documents within the exemplary system 8. The method 80 begins at block 82 where the user inputs reference information such as, for example, one or more citation conventions 20. The method 80 moves to block 84 where the text of the brief 16 and/or the one or more source documents 18 are parsed. In certain embodiments, the server 12 parses the brief 16 looking for text which may or may not match the citation convention 20 input by the user at block 82. For example in certain embodiments, the server 12 looks through the text of the brief 16 for text identifying one or more source documents 18 as the one or more source documents 18 were described by the user according to the user defined citation convention 20. The method 80 then moves to block 86 where the citations in the brief 16 are identified based on whether the text of the citation correspond to the text specified in the citation convention 20.

Figure 6:
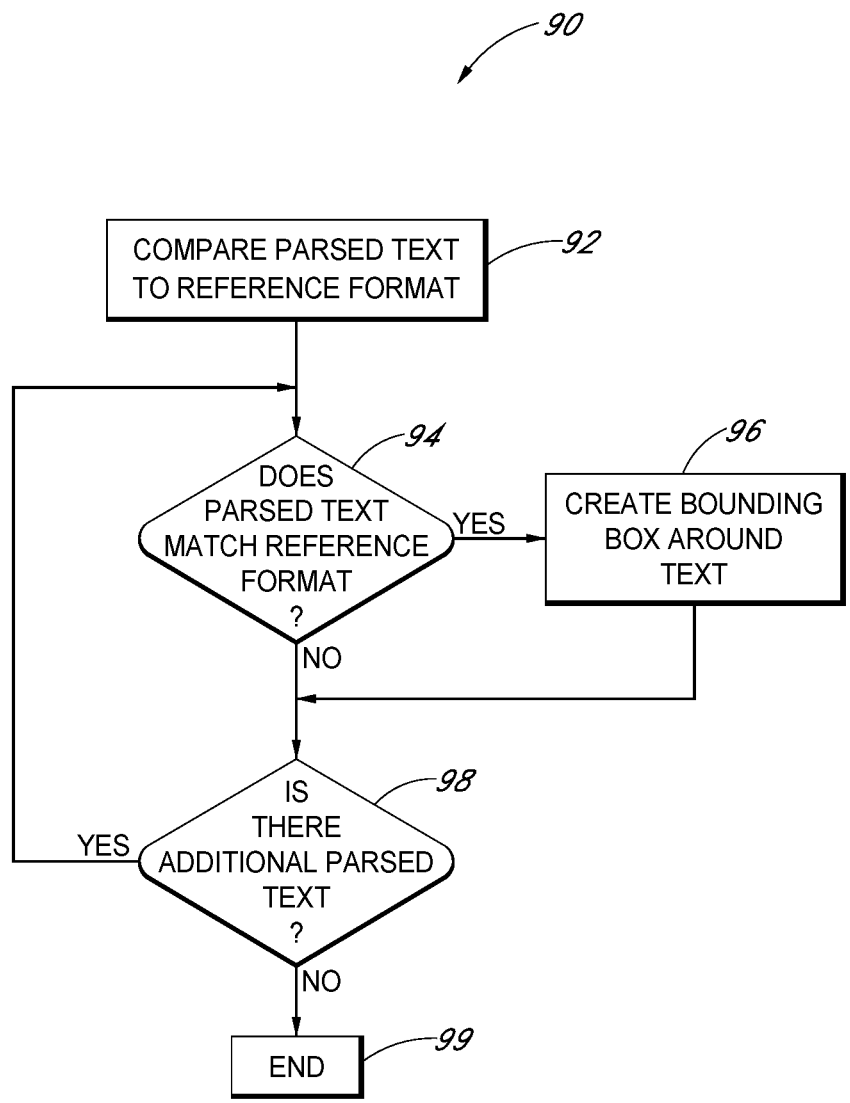
FIG. 6 is a flow chart illustrating an exemplary method for identifying the parsed text within the exemplary system.

FIG. 6 is a flow chart illustrating an exemplary method 90 for comparing parsed text within the exemplary system 8. The method 90 begins at block 92 where the identified text is then compared to the reference format. The method 90 moves to decision block 94 where a determination is made whether the parsed text matches the reference format such as the citation convention 20. If the parsed text matches the citation convention 20, the method 90 moves to block 96 where the system 8 creates a bounding box around the parsed text. In certain embodiments, the box module 34 places the bounding box around each citation identified by the parsing module 32 in the brief 16. The method 90 then moves to decision block 98 where the system 8 determines if there is any additional parsed text. If there is no additional parsed text, the method 90 moves to block 99 where the method 90 ends. If there is additional parsed text, the method 90 returns to decision block 94 as explained above.

Returning to decision block 94, if the parsed text does not match the reference format or citation convention 20, the method 90 moves to decision block 98 as described above.

Figure 7:
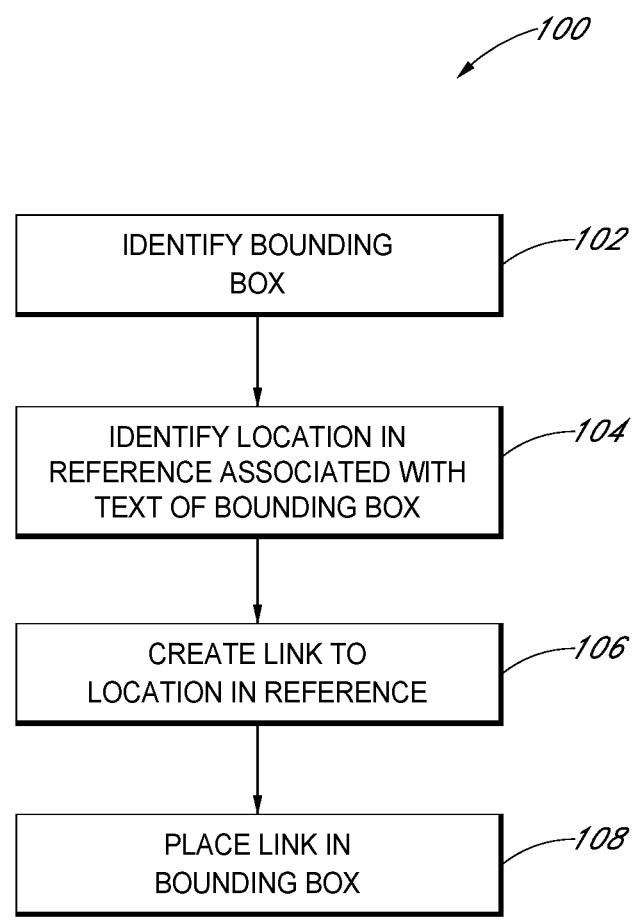
FIG. 7 is a flow chart illustrating an exemplary method for linking the parsed text within the exemplary system.

FIG. 7 is a flow chart illustrating an exemplary method 100 for linking the parsed text within the exemplary system 8. The method 100 begins at block 102 where the bounding box in the brief 16 is identified. The method 100 continues to block 104 where the location in the reference or source document 18 that corresponds to the text citation is identified. The method 100 then continues to block 106 where a hyperlink to the location in the reference or source document 18 is created. In certain embodiments, the link module 36 creates the hyperlink. The method 100 then continues to block 108 where the hyperlink to the location in the reference or source document is placed in the bounding box. The hyperlink provides an electronic link to the location(s)

within the one or more source documents 18 that corresponds to the text citation within the bounding box in the brief 16.

Figure 8:
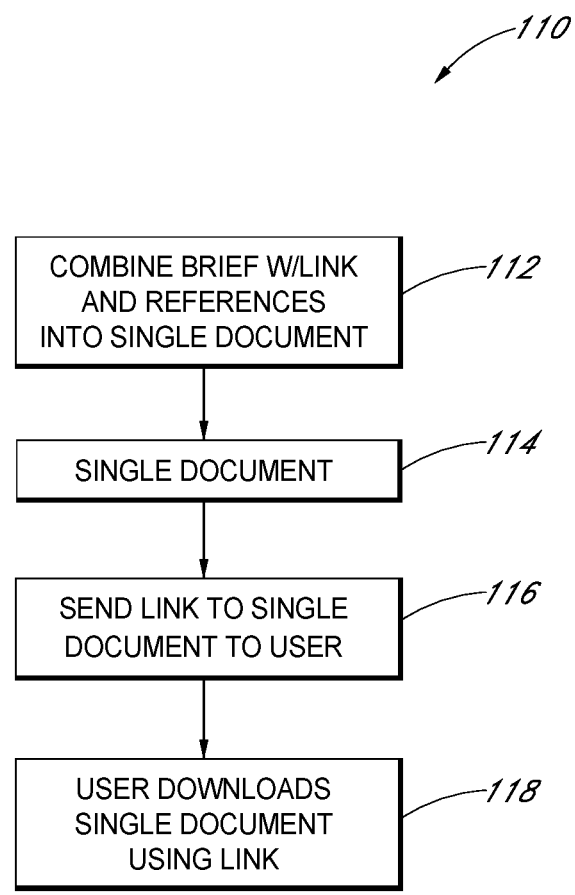
FIG. 8 is a flow chart illustrating an exemplary method for combining the brief, the links, and the source documents within the exemplary system for use by the user.

FIG. 8 is a flow chart illustrating an exemplary method 110 for combining the brief 16, the links, and the one or more source documents 18 within the exemplary system 8 for use by the user. The method 110 begins at block 112 where the system 8 combines the brief 16 and its citation links with the references or source documents 18 to form a single or final document 38 at block 114. The method 110 then continues to block 116 where the system 8 provides a link to the final document 38. Then, at block 118, the method continues with the user downloading the single or final document 38 using the link. The link is selectable to link the single or final document 38 to the input/output module 22 via the network 14 and web server. In certain embodiments, the link is embedded in the single or final document 38.

In certain embodiments as explained above with respect to FIGS. 1-8, the system 8 searches for particular types of parenthetic formats, supporting brackets and conventional parentheses, as well as for anything that may be out of the ordinary in the brief 16. In certain embodiments, strings of characters are analyzed in the brief 16 for the detection of a volume number if present, followed by any number of spaces. Once a string of characters is defined, a page number format is identified as combinations of the letter "p" with various punctuation preceding the page number, generally p, pp, p., and pp. The expression can end with ";" ")" or "]".

An exemplary implementation of the process performed by the system 8 including the application logic and regular expression is provided below.

Application Logic

Regular Expressions, or "Regex", are a sequence of symbols and characters expressing a string or pattern to be searched for by the parsing module 32 within a longer piece of text within the brief 16.

Base Regular Expression

In certain embodiments, the system 8 employs a basic regular expression for detecting citations in the brief 16 where the basic regular expression has the format:

base_regex=([\(\[ ]?\s*(\d+)?\s*(?l<reference_regex>)\s*p*\.*\s*)<page_num_regex>[;\)\]]?

In certain embodiments:

(\[ ]?\s*—Means that the detected citation can start with "(" or "[" sign which can be followed by any number of spaces.

(\d+)?\s*—Detects the volume number in the citation if it is present followed by any number of spaces.

(?l<reference_regex>)—Is a single capturing group that only matches one of the options inside the <reference_regex>. In certain embodiments, <reference_regex> is not a part of the regular expression but just a placeholder for another part of the regex which will be explained below.

\s*p*\.*\s*—In certain embodiments, this means that reference regex can be followed by p, pp, p., pp. which are abbreviations for page or pages.

<page_num_regex>—This is another placeholder for another part of the regex which will be explained below.

?—This indicates that regex can end with; or ) or]

Reference Regex

In certain embodiments, the system 8 employs the reference regex. In certain embodiments, the structure of the reference regex is marked by a placeholder <reference_regex> in the base regex. In certain embodiments, the reference regex is dynamic. For example, the reference regex can be unique for a specific user. For example, the user may employ citation conventions 20 developed by the user. Examples include AA or RT, but are not limited to the listed citation conventions 20. In certain embodiments, the reference regex is constructed from the citation conventions 20 input by the user. In this way, the reference regex can contain as many citation conventions 20 as there are source documents 18.

In certain embodiments, the user selects a subset of citation conventions 20 from a predetermined set of citation conventions 20. In this way, the system 8 can define the reference regex as dynamic based on user input of the citation conventions 20. A specific implementation is provided below.

For example, in certain embodiments, a user enters two record sources into the input/output module 22 with the following citation conventions: AA and RT. In such an embodiments, the reference regex will look like this:

(AA)|(RT)—This just indicates that regular expression should match either AA or RT.

Exhibit or Tab Numbers

In certain embodiments, the one or more source documents 18 employ Exhibit or Tab numbers prior to page numbers. In such an embodiments, the system 8 can modify the regex logic to expect exhibit or tab numbers separated by characters including spaces, commas, periods, and hyphens. These exhibit or tab numbers are processed until they encounter an abbreviation for page or pages as described above.

For example, if one of the source documents 18 is cited using Exhibit or Tab numbers prior to page numbers the regex changes. For example, in certain embodiments, if AA is marked is cited using Exhibit or Tab numbers, then the above regex would be:

(AA)\s+\d+[,.-]?[\s\d,.-]*(?=p+\.*)|(RT)

More specifically:

\s+\d+[,.-]?[\s\d,.-]*—This matches exhibit or tab numbers separated by spaces or, . -

(?=p+\.*)—This part makes sure that exhibit or tab numbers are consumed until we run into abbreviation for page or pages (p, pp, p., pp.).

Page Number Regex

In certain embodiments, the structure of the page number regex is marked by a placeholder <page_num_regex> in the base regex. In certain embodiments, it can be broken down into 3 parts: (1) page number prefix, (2) page number suffix and (3) page number format.

The page number prefix asserts that the page number is not preceded by a numeral, or finalizing character such as ";", ")", and "]". This can be advantageous to avoid mistakenly marking numbers that are not page numbers as such. For instance, the regular expression capture string logic avoids marking volume numbers of a following citation as a page number. The same regular expression capture string logic is repeated exactly for the finalizing characters above, without a space following them.

<page_num_prefix>=(\s*(?<![\d;\)\]]\s)(?<![\d;\)\]])

(?<![\d;\)\]]\s)—In certain embodiments asserts that the page number is not preceded by a digit or; or ) or] followed by a space. In certain embodiments this is used as additional assertion to prevent mistakenly marking some numbers as page numbers even if they are not page numbers, for example volume number of the next citation.

(?<![\d\d;\)]])—The same as above only without the space at the end.

The page number format body of the page number regular expression handles digit detection, and stores it as a variable. The system 8 then matches the start of the line number syntax, for instance, a colon ":", or abbreviations "lns."

"ln.," "ln", or "lns". In certain embodiments, the <page_num_format> captures the page ranges, line numbers and line ranges. <page_num_format>= (?P<target_pagenum>\d+)(\s*(:|[,.]?\s*lns?\.?)\s*\d+)? (-\s*d+(\s*(:|[,.]?\s*lns?\.)\s*\d+)?)?

(?P<target_pagenum>\d+)—In certain embodiments this means detect digit only page number and store it in a variable target_pagenum.

(\s*(:|[,.]?\s*lns?\.)—In certain embodiments this matches start of line number syntax which can start either with: or with abbreviations Ins. or ln. or ln or lns (\s*(:|[,.]?\s*lns?\.)\s*\d+)?—In certain embodiments this whole capturing group is optional and it contains the above expression for the start of the line numbers syntax and it also matches first line number.

(-\s*\d+(\s*(:|[,.]?\s*lns?.)\s*\d+)?)?—In certain embodiments this whole capturing group is used in case the line or page numbers are written as ranges separated by -. The first part of this expression -\s*\d+ captures the second number in a range. This can be a page number or a line number depending on the rest of the expression. The second part of the expression is the same as the above expression.

In certain embodiments, most of the complexity for <page_num_format> comes from the need to capture the page ranges, line numbers and line ranges. This regex can match all of the following examples:

5—just page 5
5-7—pages 5-7
5:20-30 or 5 lns. 20-30—lines 20-30 on page 5
5:30-6:10—from line 30 on page 5 until line 10 on page 6

In certain embodiments, the page number page number suffix is used to match objects in parenthesis after page number so it doesn't interfere with matching of the second page number. Example: 1143:24-1144:2 (Brigida, Orange (2005)). In this embodiment, the whole content of the parenthesis is put together in the same link indicating pages 1143-1144. This expression uses a recursive sub pattern so nested parentheses are also supported. The same as above is supported for brackets instead of parentheses, and,.)]; can follow any page number in the case that it is the final page number.

<page_num_suffix>=\s?((?P<prs>(\((?>[^( )]+|(?&prs))*\)))|(?P<brc>(\((?>[^\[\]]+|(?&brc))*\])))?[,\.\)\];]?)

(?P<prs>(\((?>[^( )]+|(?&prs))*\)))—In certain embodiments, this expression is used to match objects in parenthesis after page number so it doesn't interfere with matching of the second page number. For example: 1143:24-1144:2 (Brigida, Orange (2005)). Here the whole content of the parenthesis is put together in the same link indicating pages 1143-1144. In certain embodiments, this expression uses recursive sub pattern so nested parentheses are also supported.

(?P<brc>(\[(?>[^\[\]]+|(?&brc))*\]))—In certain embodiments, this is the same as above but parentheses are replaced by brackets [ ]. For example: 1143:24-1144:2 [Brigida, Orange (2005)].

[,\.\)\];]?—In certain embodiments, this indicates that one of ,.)]; can follow a page number.

Exemplary Implementation of Page Number Regex Use and Repeat Symbol

In certain embodiments, page number regex can be used in at least three different scenarios:

First scenario. When the system 8 wants to detect the entire citation with the record source citation convention and all the page numbers (Example: (1 RT pp. 11, 14, 15, 26-27, 90-91.)). In this case page number regex is used as part of the base regex but a repeat symbol + is added at the end of page number regex to indicate that the system 8 should match all the pages belonging to that record source in the citation. In the above example page number regex would be matched 5 times.

Second scenario. When the system 8 detects the citation with the record source citation convention and just the first page number. Continuing with the same example, the system 8 would detect only "(1 RT pp. 11,)". In this case the page number regex is used as a part of the base regex but without the repeat symbol +.

Third scenario. When the system 8 detects just the page number applied to smaller parts of the entire citation. In the above example this would be used 4 times to detect pages 14, 15, 26-27, and 90-91, separately. In this case just the page number regex is used without the base regex.

Terminology

In certain embodiments, the system runs on the python programming language and flask framework to run the application server. In certain embodiments, nginx is used as a proxy web server between the outside and our application server that also handles file uploads. In certain embodiments, the system runs as a collection of docker containers. In certain embodiments, postgres is used as a database to store user information. In certain embodiments, pdftotext is a library used to extract text with bounding boxes from pdfs, and Libreoffice is a library used to convert docx format to pdf (though this is not currently officially supported).

The description includes many terms with meanings derived from their usage in the art or from their use within the context of the description. As a further aid, the following term definitions are presented. The term "program modules" include routines, programs, objects, components, data structures, and instructions, or instructions sets, and so forth, that perform particular tasks or implement particular abstract data types. The term "document" refers to any logical collection or arrangement of machine-readable data having a filename. The term "database" includes any logical collection or arrangement of machine-readable documents. The term "hyperlink" includes any token conforming literally or functionally to any past, present, or future Uniform Resource Locator (URL) standard. It also includes any token including information identifying a specific computer system or networked device.

Although certain embodiments and examples are disclosed herein, inventive subject matter extends beyond the examples in the specifically disclosed embodiments to other alternative embodiments and/or uses, and to modifications and equivalents thereof. Thus, the scope of the claims appended hereto is not limited by any of the particular embodiments described above. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Although the system has been disclosed in the context of certain embodiments and examples, it will be understood by those skilled in the art that the system extends beyond the specifically disclosed embodiments to other alternative embodiments and/or uses of the embodiments and certain modifications and equivalents thereof. For example, aside from law, the system described above is useful in any other field where there exists a source document that references another published or unpublished source, especially where there also exists a style manual for. Such fields include, but are not limited to sciences, mathematics, engineering, physiology, medicine, humanities, and social sciences. Accordingly, it is intended that the scope of the system herein-disclosed should not be limited by the particular disclosed embodiments described above, but should be determined only by a fair reading of the claims that follow.

What is claimed is:

1. A method comprising:
   receiving an input including a first document and a second document;
   receiving an indication of a citation convention from a computing device, the citation convention is associated with the first document and includes one or more characters consistent between a first citation in the first document and a second citation in the first document;

parsing content of the first document based at least in part on the citation convention to identify a third citation, the third citation referring to a portion of the second document;

generating a combined content, the combined content including the content of the first document and content of the second document;

converting at least a first portion of the third citation in the first document to a selectable portion; and responsive to a selection of the selectable portion, transitioning a user from a position of the third citation in the combined content to a position of the portion of the second document indicated by the third citation in the combined content.

2. The method as recited in claim 1, further comprising:
identifying text of the first document associated with the third citation;
determining a correspondence between the text of the first document and text of the second document, the text of the second document associated with the position indicate by the third citation;
determining an accuracy rating associated with the text of the first document based at least in part on the correspondence; and
inserting the accuracy rating as an overlay to the text of the first document within the combined content.

3. The method as recited in claim 1, further comprising:
determining relevant text associated with the third citation based at least in part on text of the third citation; and
visually marking text of the second document corresponding to the relevant text.

4. The method as recited in claim 1, further comprising:
determining relevant text associated with the third citation based at least in part on a portion of the first document corresponding to the third citation; and
visually marking text of the second document corresponding to the relevant text.

5. The method as recited in claim 1, wherein repaginating the combined content includes updating page numbers associated with the first document and the second document and updating citations within the first document based on the updated page numbers.

6. The method as recited in claim 1, wherein the combined content maintains a structure with respect to the first document and the second document.

7. The method as recited in claim 1, further comprising:
disabling the selectable portion in response to detecting a removal of the second document from the combined content;
detecting an insertion of the second document into the combined content; and
re-enabling the selectable portion.

8. The method as recited in claim 1, further comprising:
receiving a user input, the user input including a question;
parsing the combined content for content that relates to the question; and
generating a summary of the content that relates to the question.

9. The method as recited in claim 1, further comprising:
identifying first text within the first document associated with the third citation to the second document;
identifying second text within the second document that corresponds to the first text within the first document; and
highlighting the second text within the combined content.

10. A method comprising:
receiving, at a server system from a computing device, a first document;
receiving, at the server system from the computing device, a second document, the first document referencing the second document;
receiving, at the server system from the computing device, an indication of a citation convention associated with the second document and used in the first document, the citation convention including one or more characters consistent between a first citation in the first document and a second citation in the first document;
generating a combined content, the combined content including at least a first portion of the first document and at least a first portion of the second document;
parsing the first portion of the first document based at least in part on the indication of the citation convention to identify a third citation to the second document; and
converting at least a first portion of the third citation in the combined content to a selectable portion and in response to a user selection of the selectable portion, transitioning the user from a first position in in the combined content to a second position in the combined content, the second position associated with the first portion of the second document indicated by the third citation.

11. The method as recited in claim 10, further comprising:
receiving, at the server system from the computing device, a third document, the first document referencing the third document;
receiving, at the server system from the computing device, a second indication of a second citation convention associated with the third document, wherein the combined content includes at least a first portion of the third document and the second citation convention associated with the first document and indicating one or more characters consistent between a fourth citation in the first document and a fifth citation in the first document;
parsing the first portion of the first document based at least in part on the indication of the second citation convention to identify a sixth citation to the third document; and
converting at least a first portion of the sixth citation in the combined content to a second selectable portion, the second selectable portion to transition the user from a third position in in the combined content to a fourth position in the combined content, the fourth position associated with the first portion of the third document indicated by the sixth citation.

12. The method as recited in claim 10, further comprising:
parsing the first portion of the second document;
identifying numbers on pages of the first portion of the second document differs from Bate stamp numbers associated with the second document; and
renumbering the pages of the first portion of the second document based at least in part on the Bate stamp numbers.

13. The method as recited in claim 10, further comprising:
determining a book mark based at least in part on text of a table of contents associated with the first document and the indication of a citation format; and
wherein parsing the first portion of the first document to identify the third citation to the second document is based at least in part on the citation convention.

14. The method as recited in claim 10, further comprising:
determining relevant text associated with the third citation to the second document based at least in part on text of the third citation to the second document and text of the first document corresponding to the third citation; and
visually marking the relevant text within the second document of the combined content.

15. The method as recited in claim 10, wherein:
generating the combined content includes:
generating a temporary folder structure including the first document and the second document;
causing the second document to be combined with the first document as an attachment to the first document;
the selectable portion is based at least in part on the temporary folder structure; and
the method further comprising:
causing the combined content to be processed by a third-party system, the third party system to disable the selectable portion; and
re-inserting the combined content into the temporary folder structure to reactivate the selectable portion.

16. The method as recited in claim 10, wherein the one or more characters includes a string of characters, and an end character, the string of characters including at least one punctuation character.

17. The method as recited in claim 10, further comprising:
identifying first text within the first document associated with the third citation to the second document;
identifying second text within the second document that corresponds to the first text within the first document;
identifying at least one assertion associated with the first text;
determining an accuracy of the assertion based at least in part on the second text and in part on the assertion; and
generating an overlay for the first text in the combined content, the overlay indicating the accuracy.

18. One or more non-transitory computer-readable media storing instructions that, when executed by one or more processors, cause one or more computing devices to perform operations comprising:
receiving, from a client device, a first document;
receiving, from the client device, a second document, the first document referencing the second document;
receiving, from the client device, a citation convention associated with the first document, the citation convention including the one or more characters consistent between a first citation in the first document and a second citation in the first document;
generating a combined content, the combined content including at least a first portion of the first document and at least a first portion of the second document;
parsing text of the first document based at least in part on the citation convention to identify a third citation, the third citation referencing content of the second document;
determining a bounding box associated with the third citation; and
converting a first portion of the third citation in the combined content to a selectable portion, the first portion of the third citation within the bounding box and the second selectable portion to transition the user from a position in in the combined content to a second position in the combined content, the second position associated with the content of the second document indicated by the third citation.

19. The one or more non-transitory computer-readable media as recited in claim 18, the operations further comprising:
determining relevant text associated with the third citation based at least in part on text of the third citation and a portion of the text of the first document corresponding to the third citation; and
visually marking text of the second document corresponding to the relevant text.

20. The one or more non-transitory computer-readable media as recited in claim 18, the operations further comprising:
receiving, from the client device, a request for supporting details associated with the text of the first document;
identifying the supporting details for the text of the first document in text of the second document;
generating a summary of the text of the second document; and
sending the summary to the client device.

21. The one or more non-transitory computer-readable media as recited in claim 18, wherein the operations further comprise:
identifying first text within the first document associated with the third citation to the second document;
identifying second text within the second document that corresponds to the first text within the first document; and
highlighting the second text within the combined content.

\* \* \* \* \*